Figures 1, 2:
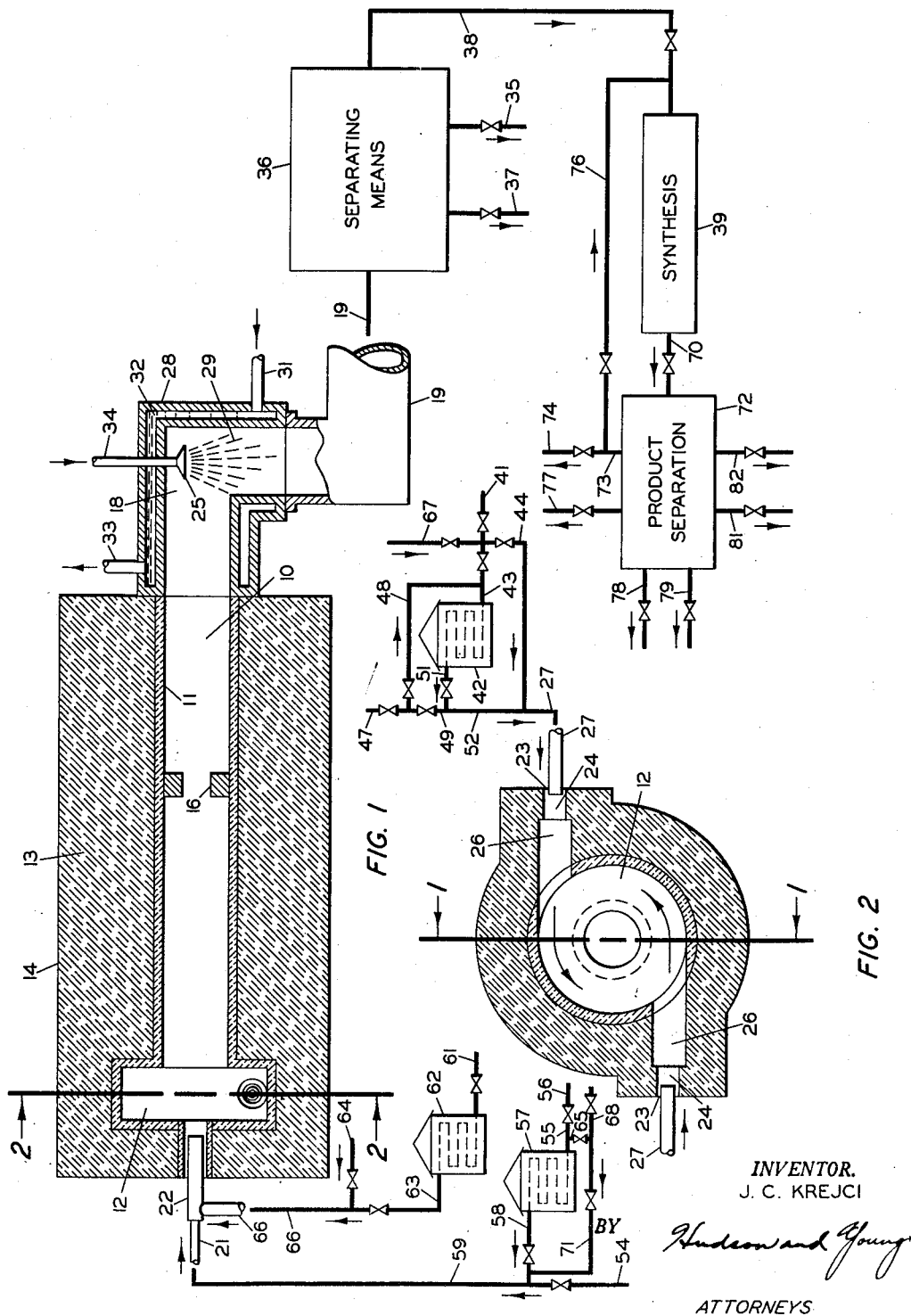

July 29, 1952 J. C. KREJCI 2,605,174
SYNTHESIS GAS MANUFACTURE
Filed Jan. 4, 1949

INVENTOR.
J. C. KREJCI
BY Hudson and Young
ATTORNEYS

Patented July 29, 1952

2,605,174

UNITED STATES PATENT OFFICE 2,605,174

SYNTHESIS GAS MANUFACTURE

Joseph C. Krejci, Phillips, Tex., assignor to Phillips Petroleum Company, a corporation of Delaware Application January 4, 1949, Serial No. 69,114

10 Claims. (Cl. 48—196)

This invention relates to the manufacture of synthesis gas. In one aspect this invention relates to the production of hydrocarbons and oxygen derivatives of hydrocarbons. In another aspect this invention relates to the manufacture of carbon monoxide-hydrogen feed stocks suitable for a synthesis step wherein hydrocarbons and oxygen derivatives of hydrocarbons are produced. In another aspect this invention relates to the partial oxidation of a methane-containing gas. In still another aspect this invention relates to the production of synthesis gas by the partial combustion of methane or natural gas in a tangential flame furnace.

Carbon monoxide-hydrogen mixtures have utility as feed stocks in various synthesis processes. In a process of the Fischer-Tropsch type, carbon monoxide may be reacted with hydrogen in the presence of a catalyst to form hydrocarbons and oxygen derivatives of hydrocarbons. In a process of the oxo type, carbon monoxide and hydrogen add to olefin hydrocarbons, usually of high molecular weight, to form aldehydes and alcohols as the chief product. In a process for the manufacture of methanol, carbon monoxide and hydrogen react to produce methanol as a chief product. In a hydrogen manufacturing process, a hydrogen and carbon monoxide mixture may be contacted with steam in the presence of an iron catalyst to produce hydrogen and carbon dioxide, and the latter removed from the total product to produce hydrogen in high purity and yield. Such processes as the Fischer-Tropsch, oxo, and methanol synthesis are generally considered to comprise two steps, a "synthesis gas preparation" step and a "synthesis" step.

In the first named step, carbon monoxide and hydrogen are prepared from raw carbon-containing materials such as hydrocarbons, coal, coke, or oil shale, by oxidation with an oxidizing gas such as oxygen, steam or carbon dioxide, either alone or in various combinations of such oxidizing agents. In some cases, various metal oxides may serve as oxidizing agents. Gas thus produced, i. e., the hydrogen-carbon monoxide product, is generally referred to as "synthesis gas" because it may be prepared in suitable yields and in a suitable mole ratio of hydrogen to carbon monoxide to render it valuable as feed gas for a synthesis step, such as above described; the term "synthesis gas" employed herein refers to such a hydrogen-carbon monoxide mixture.

Hydrocarbon gas can be partially oxidized to hydrogen and carbon monoxide by an oxidizing gas such as already mentioned, either catalytically or non-catalytically. The reaction employing carbon dioxide and/or steam is endothermic whereas the reaction employing oxygen is exothermic. The partial oxidation of a hydrocarbon to produce synthesis gas is illustrated by the following net equations, where methane representing the hydrocarbon, is oxidized by each of the oxidizing agents, oxygen, steam and carbon dioxide:

(1) $2CH_4+O_2=2CO+4H_2+30{,}800$ B. t. u.
(2) $CH_4+H_2O=CO+3H_2-88{,}700$ B. t. u.
(3) $CH_4+CO_2=2CO+2H_2-106{,}400$ B. t. u.

Regardless of which oxidizing agent is used, the resulting equilibrium product is a mixture of hydrogen, carbon monoxide, carbon dioxide, and steam, together with any unreacted hydrocarbon. The resulting equilibrium product mixture is represented by the following equation, commonly referred to as a water-gas shift equilibrium.

(4) 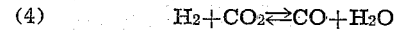
$$H_2+CO_2 \rightleftarrows CO+H_2O$$

This above equilibrium mixture "shifts" to the right or the left depending upon the prevailing temperatures subsequent to the partial oxidation reaction. For example at relatively low temperatures the equilibrium shifts to the hydrogen+carbon dioxide side, whereas at higher temperatures, the equilibrium shifts more completely in the opposite direction, provided a sufficient time is allowed to permit the mixture to come to equilibrium. The status of this equilibrium or "water-gas shift" as it is more commonly called, is important in the manufacture of synthesis gas, because unless optimum reaction temperatures are maintained and the reaction product rapidly quenched, relatively high yields of undesirable carbon dioxide are obtained.

The partial oxidation process generally comprises passing preheated oxygen and a hydrocarbon gas into a refractory lined partial oxidation or combustion chamber wherein the mixture is burned to form synthesis gas. Reaction temperatures are maintained preferably in excess of 2350° F. to obtain essentially complete hydrocarbon conversion to the desired equilibrium product mixture, and are controlled by the overall mole ratio of oxygen to hydrocarbon in the hydrocarbon-oxygen feed gas. In order to attain a temperature level in excess of 2350°

F., and in order for the reaction to be sufficiently exothermic when oxidizing natural gas, for example, a mole ratio of oxygen to hydrocarbon, above 0.6:1 is usually required. Oxygen thus employed contributes to the formation of both carbon dioxide and water, with disproportionately high concentrations of water relative to carbon dioxide being produced; consequently the mole ratio of hydrogen to carbon monoxide in the synthesis gas product is usually below preferred values, which are in the range of about 1.7:1 to about 2.3:1. In order to adjust the mole ratio of hydrogen to carbon monoxide in the synthesis gas product, either steam or carbon dioxide, or both, may be added to the hydrocarbon-oxygen feed. The reaction of each, steam and carbon dioxide, with methane is illustrated hereinabove. Steam, so added and reacted, contributes to an increased mole ratio of hydrogen to carbon monoxide in the synthesis gas product, and carbon dioxide so added and reacted, contributes to a decreased mole ratio of hydrogen to carbon monoxide therein. These reactions are highly endothermic and the concentration in the influent hydrocarbon-oxygen mixture to the partial oxidation zone, of supplementary steam and/or carbon dioxide to be so reacted, is necessarily limited in order that the partial oxidation reaction be maintained sufficiently exothermic.

Utility of carbon monoxide-hydrogen mixtures as feed stocks for various syntheses has already been discussed. However, synthesis gas has been more generally utilized in the past as feed stock for a synthesis step of a process of the Fischer-Tropsch type wherein hydrocarbons and oxygen derivatives of hydrocarbons are produced in the presence of a catalyst. In carrying out a process of the Fischer-Tropsch type, carbon monoxide and hydrogen are usually introduced into the reaction zone in a mole ratio of hydrogen to carbon monoxide within the limits of 1.7:1 to 2.3:1, often about 2:1. Temperature, pressure and space velocity conditions are selected in accordance with the nature of the type product sought and the catalyst conditions employed. Catalysts used in the Fischer-Tropsch synthesis include cobalt, iron, nickel, and ruthenium, and these may be employed alone or they may be promoted with various promoters, particularly oxides of alkali metals, or alkaline earth metals, thoria or various other known metal oxides. When employing a cobalt-containing catalyst, temperatures within the range of 360 to 430° F. may be used, whereas nickel-containing catalysts are most generally employed within a temperature range of 340 to 400° F. and iron catalysts are more generally employed at temperatures in a range of from 430 to 650° F., dependent upon the type iron catalyst employed and upon whether fluidized or fixed bed operation is utilized. Space velocities are selected primarily with respect to the form of catalyst body employed, that is, a fixed catalyst bed, or a fluidized catalyst bed or the like. When utilizing a fixed catalyst bed, space velocities may often be as low as 50 to 100 standard gas volumes of total reactants per catalyst volume per hours, whereas when operating with a fluidized catalyst bed, space velocities within the range of 1000 to 4000 standard gas volumes of total reactants per catalyst volume per hour are most generally employed. A preferred range of pressures suitable for hydrogenation is from about 5 to 15 atmospheres although pressures up to 150 atmospheres, or even higher, may be used. Fluidized catalyst bed operation, usually employing a mesh size catalyst within the limits of 80–400, is most generally employed in a process of the Fischer-Tropsch type for a number of reasons, most important of which are the high space-time yields obtained and the ease in which the exothermic heat of reaction is removed.

This invention is concerned with the manufacture of carbon monoxide-hydrogen mixtures, and particularly those having utility as feed stocks for various syntheses, particularly the Fischer-Tropsch synthesis above discussed.

An object of this invention is to provide a process for the manufacture of a carbon monoxide-hydrogen mixture.

Another object is to provide a process for the manufacture of hydrocarbons and oxygen derivatives of hydrocarbons.

Another object is to provide a process for the manufacture of synthesis gas.

It is yet another object to provide a process wherein a hydrocarbon is partially oxidized to form carbon monoxide-hydrogen feed stock suitable for use in the synthesis step of a process of the Fischer-Tropsch type.

Other objects will be apparent, to one skilled in the art, in view of the accompanying discussion and disclosure.

In accordance with this invention, carbon monoxide-hydrogen mixtures, particularly synthesis gas stocks for a process of the Fischer-Tropsch type, are manufactured from an oxygen-containing gas and a hydrocarbon gas, usually a natural gas rich in methane, in a tangential burner reactor. A portion of a methane-containing gas stock is burned with an oxygen reactant gas in such proportions that a steady flame is obtained in a tangential burner; resulting hot combustion gas, containing some hydrogen and carbon monoxide, described more fully hereafter, is then contacted with the remainder of the methane gas stock axially fed, alone or with some oxygen, into the reactor and reacted therewith to form more hydrogen and carbon monoxide at a selected temperature level maintained by heat liberated from burning the tangentially introduced feed.

In the practice of this invention, synthesis gas is prepared in a tangential burner reactor, or furnace system, containing two cylindrical sections, one of which may be termed a combustion section and the other a reaction section. These two sections are adjacent each other and coaxial, and are preferably disposed horizontally. The combustion section is positioned up stream from the reaction chamber, and has a shorter length, and preferably a larger diameter, as compared to that of the adjacently disposed reaction section. Broadly, a preferred embodiment of the process of my invention, comprises passing part of a methane feed stock into the combustion section in a direction tangent to its cylindrical side wall, and at the same time axially introducing the remainder of the methane feed either alone, or with any additionally required oxygen, into the combustion section. The tangentially introduced methane is burned and the resulting hot total product mixture from the burning, referred to herein as combustion gas, comes into contact with methane axially introduced, particularly in the reaction section. The term "combustion gas" as used herein, refers to total product from burning, which may contain in addition to products formed by combustion, any unreacted or unburned hydrocarbon and/or any inert constituents initially in admixture with the hydrocarbon or with the oxygen. For example, when burning methane with oxygen, combustion gas from that burning is considered herein to contain not only products of combustion such as carbon dioxide, steam, hydrogen or carbon monoxide, but also any unreacted hydrocarbon. When natural gas is burned, combustion gas thus formed may include nitrogen, in addition to those other possible components already named. The presence or absence, in the combustion gas of any of these components above named, depends upon the selected burning conditions. When tangentially introduced methane feed contains sufficient oxygen to completely burn methane, no carbon monoxide or hydrogen is formed. However, oxygen is preferably present in a mole ratio to methane, in a tangentially introduced feed stream, below that required for complete combustion of that methane, and consequently combustion gas more often contains carbon monoxide, hydrogen, carbon dioxide, and steam together with any unreacted methane and any inert diluents initially present in the hydrocarbon mixture. The tangentially added mixture is injected into the combustion section at sufficiently high velocity to cause combustion gas formed therein to flow spirally inward in the combustion section and substantially helically through the reaction section. Combustion gas thus formed, and methane axially introduced, pass together into the reaction section in a state of annular separation.

Operating in this manner, oxidation products in the combustion gas, other than carbon monoxide and hydrogen, may react with any remaining unburned tangentially added methane and with axially added methane, at a temperature level determined by regulating the burning of the tangentially introduced feed stock, while oxygen, added axially, with methane may react therewith and/or with any remaining unburned methane tangentially introduced. Preferably, in order to attain the maximum desired temperature in the reaction system, both the axial and tangential feeds are preheated, although it is within the scope of my invention to preheat one or the other, or neither. Preferably the tangential feed contains less than sufficient oxygen for its complete combustion and the axial feed contains the remainder of the oxygen reactant. Burning within the combustion chamber is regulated by adjusting the mole ratio of oxygen to methane introduced, and by adjusting the quantity of tangential feed burned. The partial oxidation reaction takes place in both the combustion and reaction sections, and is conducted in the tangential burner reactor system under controlled conditions of temperature, oxygen to feed stock overall mole ratio, and contact time, to produce synthesis gas containing hydrogen and carbon monoxide in a desired hydrogen to carbon monoxide ratio within a wide range.

The accompanying diagrammatic drawing illustrates a preferred form of tangential burner reactor apparatus that may be employed in the practice of my invention. However, it is to be understood that various modifications of the illustrated process and apparatus may be made and still remain within the scope of my invention. Figure 1 includes a transverse sectional view of a furnace embodying my invention, and taken on the line 1—1 of Figure 2, together with a diagrammatic flow sheet illustrating other apparatus used in practicing a preferred embodiment of this invention. Figure 2 is a longitudinal sectional view of the same furnace taken on the line 2—2 of Figure 1.

Referring to Figure 1, elongated reaction section 10 is lined with highly refractory material 11 such as corundum brick, silica brick, mullite brick, zirconia brick, sillimanite brick, or other similar suitable materials resistant to high temperatures developed therein. Up stream from and adjacent to section 10 is combustion section 12, coaxial with section 10. Section 12 is also lined with lining material 11 already described. Lined sections 10 and 12 are surrounded by a layer of insulating material 13 and the whole is contained in an outer steel shell 14. Combustion chamber 12 has a relatively large diameter in comparison to its length while the reverse is true of reaction section 10. In a lower portion of section 10 is an orifice choke 16.

In the upstream or inlet end of combustion zone 12, is feed inlet conduit 21 arranged axially so that feed introduced therethrough will pass axially through both sections 12 and 10. Surrounding feed conduit 21 is a coaxial, larger conduit, or oxygen inlet 22. The arrangement of conduits 21 and 22 defines an annular space through which oxygen may be axially passed into chamber 12. Oxygen when passed through that annular space serves to cool the inner end of conduit 21; if any carbon deposits thereon, oxygen thus introduced will support combustion to burn the carbon free. Diluted oxygen, steam, air, or a mixture thereof may also be introduced through this annulus. Referring to Figure 2, in combustion zone 12 are arranged inlets 23 which are so disposed that gas may be passed therethrough and into combustion zone 12 in a direction tangential to its cylindrical wall. Each tangential gas inlet 23 may consist of a small conduit 24 joining a larger conduit or tunnel 26, which latter terminates as an opening into chamber 12. An inlet pipe 27 extends part way into conduit 24. As mentioned hereinbefore, the tangential gas inlet assembly is so arranged that gas entering chamber 12 therethrough does so in a direction tangent to the cylindrical wall at its point of inlet. Most of the tangentially introduced gas is burned within tunnels 26.

Cooling assembly 18 down stream from reaction section 10 and adjacent thereto consists of water jacket 28, water spray 29, water inlet conduit 31 to jacket 28, space 32 in which cooling water is passed through jacket 28, water outlet 33 from jacket 28, and water inlet 34 to sprayer nozzle 25.

In a preferred operation of the process of my invention a combustion mixture of methane and oxygen is preheated and charged to tangential burners 23. This may be done by introducing methane from line 41 through line 43 in admixture with oxygen introduced from line 47 through line 48, into preheater 42 wherein the resulting methane-oxygen admixture is preheated to the desired temperature. Preheated methane-oxygen is withdrawn from preheater 42 through line 51 and introduced tangentially into combustion chamber 12 through lines 52 and 27. If it is desired to dispense with all preheating, methane from line 41 and oxygen from line 47 may be respectively introduced to line 27 from line 44 and from lines 49 and 52. In some instances it may be advantageous to preheat a selected portion of either or of both the methane and oxygen and to introduce the preheated gas into line 27 together with oxygen and/or methane by-passing preheater 42 through lines 49 and 44 respectively. Tangentially introduced gas is burned in tunnels 26, the combustion gases thus produced traveling spirally toward the center within combustion zone 12 and then traveling helically throughout the elongated section as a blanket along the wall. The mole ratio of oxygen to methane in the total tangential feed is greater than the overall mole ratio of oxygen to methane introduced into the reaction system, and is preferably less than that required for complete combustion of the methane introduced therewith. The remainder of the methane and any remaining required oxygen are each preheated and introduced axially into combustion chamber 12. This may be done by preheating methane introduced from line 56, in preheater 57 and passing the resulting preheated gas through lines 58, 59 and 21, axially into the reaction system. If it is desired to dispense with methane preheating, methane from line 54 may be introduced into lines 59 and 21. If desired, preheated gas from line 58 may be admixed in line 59 with methane from line 54 in any desired proportion. When introducing oxygen into the reaction system axially, oxygen from line 61 is preheated in preheater 62, and the resulting preheated oxygen is passed through lines 63 and 66 into combustion chamber 12, through an annular space provided by pipes 22 and 21 described hereinbefore. Oxygen from line 64 may be admixed in line 66 with preheated oxygen from line 63 when desired. However, if desired, preheating of oxygen in preheater 62 may be dispensed with, in which case oxygen from line 64 would be the sole source of oxygen in line 66. In many instances, it may be desirable to charge a mixture of oxygen and methane through axial pipe 21, the feed in this case to line 56 or 54 being that mixture, the feed point chosen according to whether or not preheating is desired. Better results are usually obtained when a portion of the oxygen is premixed with the axial feed. The mole ratio of oxygen to methane in the total axially introduced feed is less than the overall mole ratio of oxygen to methane introduced into the reaction system. The volume ratio of total axially introduced hydrocarbon gas to total tangentially introduced hydrocarbon gas is within the limits of 0.3:1 to 3:1, and preferably within the limits of 1.5:1 to 3:1.

The amount of preheat for all reactants herein is limited in the case of an oxygen stream by its reactivity, and in the case of an oxygen-methane mixture, by the tendency of that mixture to preignite. For that reason it is usually desirable to limit the preheat on any of the oxygen-containing feed streams discussed herein to a temperature usually not greater than about 1000° F. When preheating hydrocarbon, alone, preheat temperatures within the range of 800–1200° F. may be advantageously employed.

When it is desired to adjust the mole ratio of hydrogen to carbon monoxide in the final synthesis gas product by supplementing the methane feed with steam or carbon dioxide, the supplementary gas, i. e., steam and/or carbon dioxide, may be introduced into the reaction system, axially, tangentially, or both. Supplementary gas from line 68 may be passed through line 71 directly to combustion section 12 through lines 59 and 21, or it may be passed through lines 65 and 55, to preheater 57, preheated therein, and then passed through lines 51, 52 and 27 into combustion section 12. If desired, selected portions of supplementary gas may be preheated and admixed with unheated supplementary gas in line 59. Similarly, supplementary gas from line 67 may be passed to combustion section 12 through lines 44 and 27, or it may be passed through line 43 to preheater 42, preheated therein and then passed through lines 51, 52 and 27 into combustion section 12. If desired, selected portions of supplementary gas may be preheated and admixed with unheated supplementary gas in line 27. The maximum amount of supplementary gas added, in any case, is limited to that amount which can be utilized while still maintaining the overall partial oxidation sufficiently exothermic, i. e., so that the overall partial oxidation reaction is not endothermic. Although supplementary steam and/or carbon dioxide gas may be introduced axially, tangentially, or both, I prefer the former, i. e., its axial addition. A specific manner in which steam and/or carbon dioxide may be added together with a gaseous hydrocarbon to a cylindrical partial oxidation chamber, as an endothemically reacting protective gas mixture for the chamber wall, in a process for the manufacture of synthesis gas, is disclosed in the copending application of J. S. Cromeans, Serial No. 84,124, filed March 29, 1949.

The burning taking place in tunnels 26 serves as the source of heat for the partial oxidation taking place in the system, and is regulated by adjusting the amount of tangential feed and the mole ratio of oxygen to methane therein. Sufficient heat is provided to effect the partial oxidation at a temperature within the range of 2000 to 2500° F., preferably from 2400 to 2500° F. Combustion products of the burning in tunnels 26 comprise carbon dioxide, hydrogen, steam, and carbon monoxide in relative amounts dependent largely upon the mole ratio of oxygen to methane in the tangential feed.

The walls of the reaction section being blanketed by combustion gas provides the advantage that the low oxygen content axial stream does not contact the walls until reaching the latter portion of the reactor, and thus little chance is afforded the hydrocarbons to contact the hot walls and decompose with the formation of undesirable carbonaceous deposits.

In order to establish a most favorable equilibrium in the net reaction product, it is necessary that all carbon dioxide and steam therein are substantially completely reacted with any unreacted methane present. In order to promote equilibrium in the total product gas of the reactor, I prefer to employ a mixing orifice or choke 16, in elongated section 10, in order to facilitate the mixing of the central stream and the helical blanket. This orifice or choke is so positioned that mixing is effected following the portion of section 10 in which rapid initial reaction takes place. This will insure complete contact of steam and carbon dioxide in the wall blanket with unconverted methane in the central portion and will thus promote further reaction and attainment of more complete equilibrium.

When desired, the hot reaction mixture may be freed of any suspended carbon and then passed over a mop-up catalyst such as nickel, cobalt, or iron, in order to accelerate the reaction of any remaining steam and carbon dioxide with unconverted methane. This is especially advantageous when the gas mixture contains unreacted methane and has cooled to a temperature as low as 2000° F. or less, since the equilibrium provided in the presence of such a catalyst is favorable, at temperatures as low as 1500° F. Operating in this manner, the rate of reaction between any remaining carbon dioxide and/or steam, with any unreacted methane is sufficiently high to permit utilizing the sensible heat of the gas in those endothermic reactions until the gas temperature is as low as 1500° F., thus permitting the greater heat efficiency in the operation of the process. However, at reaction temperatures of from 2400° F. to 2500° F., the water-gas equilibrium is shifted so that very little carbon dioxide remains in the product gas, and the use of a catalyst is not particularly advantageous, provided the product gas is rapidly quenched to a temperature somewhat below 1200° F., such as from 800° F. to 1000° F. When operating in this manner, product gas from section 10 is passed into cooling assembly 18 described hereinabove and rapidly quenched to a temperature below 1200° F., in both indirect and direct heat exchange relation with water. Product gas from cooling assembly 28 is then conducted through line 19 to purification zone 36 wherein any entrained carbon or tarry materials, formed in zones 12 and/or 10, are removed. Carbonaceous materials entrained in gas product entering zone 36 and separated in zone 36 may be withdrawn through line 37. Steam present in the gas entering zone 36 is removed therein preferably by condensation and withdrawn as water through line 35. Purified synthesis gas is passed from zone 36 through line 38 to a Fischer-Tropsch synthesis step 39 wherein the hydrogen and carbon monoxide are reacted in the presence of a catalyst as described hereinbefore, to form hydrocarbons and oxygen derivatives of hydrocarbons. Total effluent from zone 39 is passed through line 70 to product separation means 72 comprising coolers, storage tanks, fractionation equipment and the like, not individually illustrated, and which are ordinarily employed in the separation of product fractions contained in the effluent to a Fischer-Tropsch synthesis. Tail gas comprising carbon dioxide, hydrogen and some carbon monoxide is withdrawn from zone 72 through lines 73 and 74 or may be recycled through lines 73 and 76 to the Fischer-Tropsch synthesis. Other selected fractions withdrawn from zone 72 may be a normally gaseous hydrocarbon fraction through line 77, a gasoline fraction through line 78, a gas-oil fraction through line 79, a heavy wax and wax-like product fraction through line 81, and by-product water through line 82.

For convenience and clarity certain apparatus, such as pumps, surge tanks, accumulators, valves, etc. have not been shown in the drawing. Obviously such modifications of the present invention may be practiced without departing from the scope of the invention.

In the preferred embodiment above described, the overall oxygen to methane mole ratio is somewhat above the theoretical of 0.5:1 as indicated by Equation 1 hereinabove, about 0.52:1 to 0.85:1 being a suitable range; when air is the oxidizing gas the air-methane overall volume ratio is preferably within the limits of 2.60:1 to 4.25:1. When charging methane stocks containing other suitable hydrocarbons higher overall oxygen to natural gas mole ratios are employed, e. g., when charging natural gas, usually containing from 70–85 per cent methane, a mole stoichiometric ratio of oxygen to natural gas within the limits of 0.6:1 to 0.9:1 is advantageously employed; when air is the oxidizing gas the preferred mole ratio of air to natural gas is preferably within the limits of 3.0:1 to 4.5:1.

Though methane alone may be fed axially, more efficient conversions are obtained when a portion of the oxygen is added axially.

Reaction pressure is usually about atmospheric, although elevated pressures may be employed when desired.

The ratio of length to diameter of reaction section 10 may be varied, but for any given diameter, the length should be sufficient to provide a contact time sufficient for complete reaction such as, for example from about 0.05 to about 5 seconds and preferably less than about 0.5. The ratio of the diameter of the enlarged combustion zone to the diameter of the elongated reaction section may be varied, although a ratio between the limits of 1.5:1 to about 4:1 is preferred. It is within the scope of this invention to utilize an unenlarged combustion section. When so operating it may often be advantageous to employ a greater number of tangential burners to blanket the reactor walls.

In the partial oxidation of hydrocarbon stocks to produce hydrogen-carbon monoxide mixtures suitable for use as synthesis gas in a process of the Fischer-Tropsch type, oxygen of at least 90 to 95 per cent purity is preferably employed. However, when desired, an oxygen-containing gas such as air or any suitable oxygen-enriched gaseous mixture may be utilized, although the final synthesis gas product is rich in nitrogen, and its utility as feed stock for a Fischer-Tropsch synthesis is less, not only from an economic standpoint, but also with respect to the effect of the presence of such high concentrations of nitrogen on the ultimate yield of desired Fischer-Tropsch products. However, such nitrogen-containing product gases may be utilized as synthesis gas if desired, or as a fuel gas, or for any purpose for which a low B. t. u.-containing gas is needed, and the use of an oxygen-containing gas such as air or any other suitable oxygen-containing gas, is within the scope of my invention.

Although in a preferred embodiment of my invention I produce hydrogen-carbon monoxide stocks suitable for use as synthesis gas in a process of the Fischer-Tropsch type, it is within the scope of my invention to alter conditions of my process to produce other types of hydrogen-carbon monoxide-containing gases, having utility in various applications other than as a Fischer-Tropsch synthesis feed stock, particularly as fuel gas. In the practice of this embodiment, overall mole ratio of oxygen to hydrocarbon feed, regulated operating temperature, and choice of hydrocarbon feed stock, are imported variables lending themselves to application within wider ranges of process conditions, than those necessarily adhered to in the practice of my preferred embodiment, i. e., in the manufacture of synthesis gas.

Advantages of this invention are illustrated by the following examples. The reactants and their proportions, and other specific ingredients are presented as being typical and should not be construed to limit the invention unduly.

*Example 1*

Synthesis gas is formed in a tangential burner reactor having a 33 inch combustion section with two tangential burners. The axial length is 12 inches. The reaction section is coaxial with the combustion section and is 12 inches in diameter and 11 feet long. Air is used as the oxygen-containing gas and the hydrocarbon feed gas is natural gas having the following composition:

| Component: | Mole per cent |
|---|---|
| Nitrogen | 8.5 |
| Methane | 81.4 |
| Ethane | 5.8 |
| Propane | 3.1 |
| Butane | 0.9 |
| Pentanes and heavier | 0.03 |

Process conditions and synthesis gas product obtained are summarized in the following table.

OPERATING DATA AND RESULTS

| Run No. | Gas Feed, CFH | | Tang. Air Rate, CFH | Tang. Feed, Air-Gas Volume Ratio | Air-Gas Volume Ratio, Total Feed | Axial Feed Gas Temp. °F. | Effluent Analysis Percent by Volume | | | | | Unsaturates | Comb. Chamber Temp. °F. |
|---|---|---|---|---|---|---|---|---|---|---|---|---|---|
| | Axial | Tangential | | | | | $CO_2$ | CO | $H_2$ | $CH_4$ | $N_2$ | | |
| P-124 | 9,000 | 3,950 | 50,000 | 12.6 | 3.86 | 1,000 | 4.62 | 7.95 | 17.61 | 3.25 | 65.05 | 1.52 | 2,840 |
| P-125 | 11,150 | 4,060 | 50,000 | 12.3 | 3.28 | 1,000 | 6.27 | 6.34 | 16.91 | 4.76 | 64.14 | 1.58 | 2,635 |
| P-126 | 6,000 | 7,100 | 50,000 | 7.1 | 3.8 | 1,000 | 4.71 | 8.98 | 15.48 | 5.85 | 63.53 | 1.45 | 2,705 |
| P-127 | 8,000 | 7,100 | 50,000 | 7.1 | 3.33 | 1,000 | 4.61 | 8.45 | 15.28 | 7.85 | 62.26 | 1.55 | 2,700 |
| P-128 | 10,100 | 7,100 | 50,000 | 7.1 | 2.9 | 1,000 | 4.56 | 8.18 | 14.38 | 9.37 | 61.62 | 1.89 | 2,752 |
| P-129 | 13,200 | 7,100 | 50,000 | 7.1 | 2.46 | 1,000 | 4.12 | 7.80 | 13.77 | 11.54 | 59.52 | 2.27 | 2,770 |
| P-102 [1] | 8,000 | 3,970 | 50,000 | 12.5 | 4.5 | 1,000 | 4.52 | 9.32 | 16.08 | 2.43 | 67.59 | | 2,800 |
| P-101 [2] | 8,000 | 3,970 | 50,000 | 12.5 | 4.35 | 1,000 | 4.44 | 9.24 | 16.46 | 2.32 | 67.54 | | 2,783 |
| P-105 | 6,240 | 7,100 | 50,000 | 7.1 | 3.8 | 60 | 4.67 | 9.58 | 13.40 | 6.22 | 66.13 | | 2,691 |

[1] 4,000 CFH air mixed with axial gas feed.
[2] 2,000 CFH air mixed with axial gas feed.

Runs P-105 and P-126 are nearly identical with the exception of the axial feed temperature. By material balance, the preheated axial feed run shows substantially no carbon formation, whereas the unpreheated feed shows carbon produced. The comparison of these two examples illustrates the advantage of preheating, at least the axial feed.

A comparison of runs P-124 and P-126 each having been conducted approximately under the same total feed and reaction conditions, shows that undesirable carbon formation takes place when the tangential burner feed contains more than a theoretical quantity of oxygen for completely burning the tangentially introduced hydrocarbon, whereas substantially no carbon is formed when the tangential burner feed contains a greater amount of hydrocarbon and the axial feed less.

A comparison of runs P-101 and P-102 shows the effect of change in oxygen content of the axial feed. Undesirable formation of carbon increases with decreasing oxygen content of the axial feed.

*Example 2*

Synthesis gas is formed in accordance with the process of Example 1, in a tangential burner reactor of the type described in Example 1, except that commercial grade oxygen is used in the place of air, and methane is charged instead of natural gas. Methane is charged axially at the rate of 6000 c. f. h. and tangentially at the rate of 7,100 c. f. h. Oxygen is introduced tangentially at the rate of 10,000 c. f. h., the oxygen to methane mole ratio in the tangential feed being 1.4:1, and the overall oxygen to methane mole ratio being 0.76:1. Axially introduced feed is preheated to 1000° F. Gaseous effluent from the burner reactor has a composition as follows:

| Component: | Mole per cent |
|---|---|
| Carbon dioxide | 12.9 |
| Carbon monoxide | 24.5 |
| Hydrogen | 42.6 |
| Methane | 16.0 |
| Unsaturates | 4.0 |
| Total | 100.0 |

As will be evident to those skilled in the art, various modifications of this invention can be made, or followed, in the light of the foregoing disclosure and discussion, without departing from the spirit or scope of the disclosure or from the scope of the claims.

I claim:

1. A process for producing synthesis gas, comprising injecting a mixture of natural gas and oxygen at a velocity described hereafter, into a first cylindrical zone having a diameter greater than its length, in a direction tangent to the inner side wall of said first cylindrical zone, and in a mole ratio of oxygen to natural gas higher than an overall oxygen to natural gas mole ratio described hereafter and lower than that required for completely burning the tangentially introduced natural gas; burning said tangentially introduced natural gas in said first cylindrical zone, and regulating said burning as described hereafter; passing combustion gas formed from said burning, from said first cylindrical zone into and through a second cylindrical zone longer than, coaxial with, and adjacent said first cylindrical zone, and having a diameter smaller than that of said first cylindrical zone; regulating said burning to produce heat to maintain a temperature through said first and second cylindrical zones within the limits of 2000–2500° F.; maintaining said velocity of tangentially injected natural gas and oxygen sufficiently high that said combustion gas follows an inward spiral path in said first cylindrical zone and a helical path through said second cylindrical zone adjacent the inner wall of at least an initial portion thereof; passing oxygen and natural gas axially into said first cylindrical zone in a mole ratio of oxygen to natural gas lower than said overall mole ratio, and through said second cylindrical zone, whereby axially introduced gas passes longitudinally through said first cylindrical zone and then into said second cylindrical zone in an initial state of annular separation from helically flowing gases; maintaining a mole ratio of total axially and tangentially introduced oxygen to total axially and tangentially introduced natural gas within the limits of 0.6:1 to 0.9:1 as said overall mole ratio described above; maintaining the volume of total axially introduced hydrocarbon to total tangentially introduced hydrocarbon within the limits of 1.5:1 to 3:1; withdrawing effluent from said second cylindrical zone and quickly quenching same to a temperature below 1000° F.; and recovering from the quenched effluent a hydrogen-carbon monoxide gas mixture suitable for use as synthesis gas in a process of the Fischer-Tropsch type.

2. The process of claim 1 wherein axially introduced reactants are preheated to a temperature not exceeding 1000° F.

3. The process of claim 1 wherein tangentially introduced feed is preheated to a temperature not exceeding 1000° F.

4. The process of claim 1 wherein natural gas to be added tangentially is preheated and admixed with unpreheated oxygen and the resulting admixture is introduced into said first zone at a temperature not higher than 1000° F.

5. The process of claim 1 wherein natural gas to be introduced axially is preheated to a temperature in the range of 800 to 1200° F.

6. The process of claim 1 wherein supplementary steam is axially introduced into said first zone to adjust the mole ratio of hydrogen to carbon monoxide in the synthesis gas product, in an amount not exceeding that which can be utilized while still maintaining the overall partial oxidation autothermic.

7. The process of claim 1 wherein the flow of gases through a downstream portion of said second cylindrical zone is partially obstructed to facilitate mixing of any remaining unreacted oxidizing gas with any unreacted hydrocarbon to promote further reaction to form carbon monoxide and hydrogen.

8. A process for producing a hydrogen-carbon monoxide gas mixture suitable for use as synthesis gas in a process of the Fischer-Tropsch type, comprising injecting a mixture of natural gas and air at a velocity described hereafter, into a first cylindrical zone having a diameter greater than its length, in a direction tangent to the inner side wall of said first cylindrical zone, and in a volume ratio of air to natural gas higher than an overall air to natural gas volume ratio described hereafter and lower than that required for completely burning the tangentially introduced natural gas; burning said tangentially introduced natural gas in said first cylindrical zone, and regulating said burning as described hereafter; passing combustion gas formed from such burning, from said first cylindrical zone into and through a second cylindrical zone longer than, coaxial with, adjacent said first cylindrical zone, and having a diameter smaller than that of said first cylindrical zone; regulating said burning to produce heat to maintain a temperature through said first and second cylindrical zones within the limits of 2000–2500° F.; maintaining said velocity of tangentially injected natural gas and air sufficiently high that said combustion gas follows an inward spiral path in said first cylindrical zone and a helical path through said second cylindrical zone adjacent the inner wall of at least an initial portion thereof; passing air and natural gas axially into said first cylindrical zone in a volume ratio of air to natural gas lower than said overall volume ratio, and through said second cylindrical zone, whereby axially introduced gas passes longitudinally through said first cylindrical zone and into said second cylindrical zone in an initial state of annular separation from helically flowing gases; maintaining a volume ratio of total axially and tangentially introduced air to total axially and tangentially introduced natural gas within the limits of 3.0:1 to 4.5:1 as said overall mol ratio described above; maintaining the volume ratio of total axially introduced hydrocarbon to total tangentially introduced hydrocarbon within the limits of 1.5:1 to 3:1; withdrawing effluent from said second cylindrical zone and quickly quenching same to a temperature below 1000° F.; and recovering from quenched effluent a hydrogen-carbon monoxide gas mixture suitable for use as synthesis gas in a process of the Fischer-Tropsch type.

9. A process for producing a hydrogen-carbon monoxide gas mixture suitable for use as synthesis gas in a process of the Fischer-Tropsch type, comprising injecting a mixture of methane and air at a velocity described hereafter, into a first cylindrical zone having a diameter greater than its length, in a direction tangent to the inner side wall of said first cylindrical zone, and in a volume ratio of air to methane higher than an overall air to methane volume ratio described hereafter and lower than that required for completely burning the tangentially introduced methane; burning said tangentially introduced methane in said first cylindrical zone, and regulating said burning as described hereafter; passing combustion gas formed from said burning, from said first cylindrical zone into and through a second cylindrical zone, longer than, coaxial with, adjacent said first cylindrical zone, and having a diameter smaller than that of said first cylindrical zone; regulating said burning to produce heat to maintain a temperature through said first and second cylindrical zones within the limits of 2000–2500° F.; maintaining said velocity of tangentially injected methane and air sufficiently high that said combustion gas follows an inward spiral path from said first cylindrical zone and a helical path through said second cylindrical zone adjacent the inner wall of at least an initial portion thereof; passing air and methane axially into said first cylindrical zone in a volume ratio of air to methane lower than said overall volume ratio, and through said second cylindrical zone, where by axially introduced gas passes longitudinally through said first cylindrical zone and into said second cylindrical zone in an initial state of annular separation from helically flowing gases; maintaining a volume ratio of total axially and tangentially introduced air to total axially and tangentially introduced methane within the limits of 2.60:1 to 4.25:1, as said overall volume ratio described above; maintaining the volume ratio of total axially introduced methane to total tangentially introduced methane within the limits of 1.5:1 to 3:1; withdrawing effluent from said second cylindrical zone and quickly quenching same to a temperature below 1000° F.; and recovering from the quenched effluent a hydrogen-carbon monoxide gas mixture suitable for use as synthesis gas in a process of the Fischer-Tropsch type.

10. A process for producing a hydrogen-carbon monoxide gas mixture suitable for use as synthesis gas in a process of the Fischer-Tropsch type, comprising injecting a mixture of methane and oxygen at a velocity described hereafter, into a first cylindrical zone having a diameter greater than its length, in a direction tangent to the inner side wall of said first cylindrical zone, and in a volume ratio of oxygen to methane higher than an overall oxygen to methane volume ratio described hereafter and lower than that required for completely burning the tangentially introduced methane; burning said tangentially introduced methane in said first cylindrical zone, and regulating said burning as described hereafter; passing combustion gas formed from such burning, from said first cylindrical zone into and through a second cylindrical zone, longer than, coaxial with, adjacent said first cylindrical zone, and having a diameter smaller than that of said first cylindrical zone; regulating said burning to produce heat to maintain a temperature through said first and second cylindrical zones within the limits of 2000-2500° F.; maintaining said velocity of tangentially injected methane and oxygen sufficiently high that said combustion gas follows an inward spiral path in said first cylindrical zone and a helical path through said second cylindrical zone adjacent the inner wall of at least an initial portion thereof; passing oxygen and methane axially into said first cylindrical zone in a volume ratio of oxygen to methane lower than said overall volume ratio, and through said second cylindrical zone, whereby axially introduced gas passes longitudinally through said first cylindrical zone and then into said second cylindrical zone in an initial state of annular separation from helically flowing gases; maintaining a volume ratio of total axially and tangentially introduced oxygen to total axially and tangentially introduce methane within the limits of 0.52:1 to 0.85:1, as said overall volume ratio described above; maintaining the volume ratio of total axially introduced methane to total tangentially introduced methane within the limits of 1.5:1 to 3:1; withdrawing effluent from said second cylindrical zone and quickly quenching same to a temperature below 1000° F.; and recovering from the quenched effluent a hydrogen-carbon monoxide gas mixture suitable for use as synthesis gas in a process of the Fischer-Tropsch type.

JOSEPH C. KREJCI.

REFERENCES CITED

The following references are of record in the file of this patent:

UNITED STATES PATENTS

| Number | Name | Date |
| --- | --- | --- |
| 2,051,363 | Beekley | Aug. 18, 1936 |
| 2,106,137 | Reed | Jan. 18, 1938 |
| 2,347,682 | Gunness | May 2, 1944 |
| 2,368,828 | Hanson et al. | Feb. 6, 1945 |
| 2,375,795 | Krejci | May 15, 1945 |
| 2,375,796 | Krejci | May 15, 1945 |
| 2,375,797 | Krejci | May 15, 1945 |
| 2,375,798 | Krejci | May 15, 1945 |
| 2,419,565 | Krejci | Apr. 29, 1947 |
| 2,450,500 | Clark | Oct. 5, 1948 |